United States Patent [19]

Nickelsen et al.

[11] 3,944,426

[45] *Mar. 16, 1976

[54] METHOD OF SINTERING CALCIUM ALUMINATE RAW MIXES

[75] Inventors: Hubert O. Nickelsen, Saratoga, Calif.; Joseph E. Kopanda, Crown Point; Felix J. Piasecki, Whiting, both of Ind.

[73] Assignee: United States Steel Corporation, Pittsburgh, Pa.

[ * ] Notice: The portion of the term of this patent subsequent to July 18, 1989, has been disclaimed.

[22] Filed: Mar. 18, 1974

[21] Appl. No.: 452,030

Related U.S. Application Data

[60] Continuation-in-part of Ser. No. 249,011, May 1, 1972, abandoned, which is a division of Ser. No. 58,188, July 24, 1970, Pat. No. 3,677,781, which is a continuation-in-part of Ser. No. 677,991, Oct. 25, 1967, abandoned.

[52] U.S. Cl................................ 106/100; 106/104
[51] Int. Cl.$^2$........................................ C04B 7/42
[58] Field of Search........................... 106/100, 104

[56] References Cited
UNITED STATES PATENTS

| | | | |
|---|---|---|---|
| 3,251,701 | 5/1966 | Klein................................... | 106/100 |
| 3,257,219 | 6/1966 | Klein................................... | 106/104 |
| 3,498,594 | 3/1970 | Rikhof................................. | 106/100 |
| 3,677,781 | 7/1972 | Nickelsen et al.................... | 106/104 |

*Primary Examiner*—J. Poer

[57] ABSTRACT

In sintering calcium aluminate raw mixes for use in calcium aluminate cements from 0.5 to 4.0% by weight of SO$_3$ is added to the mix in the form of CaSO$_4$ to broaden the sintering range.

4 Claims, 3 Drawing Figures

FIG. 1.
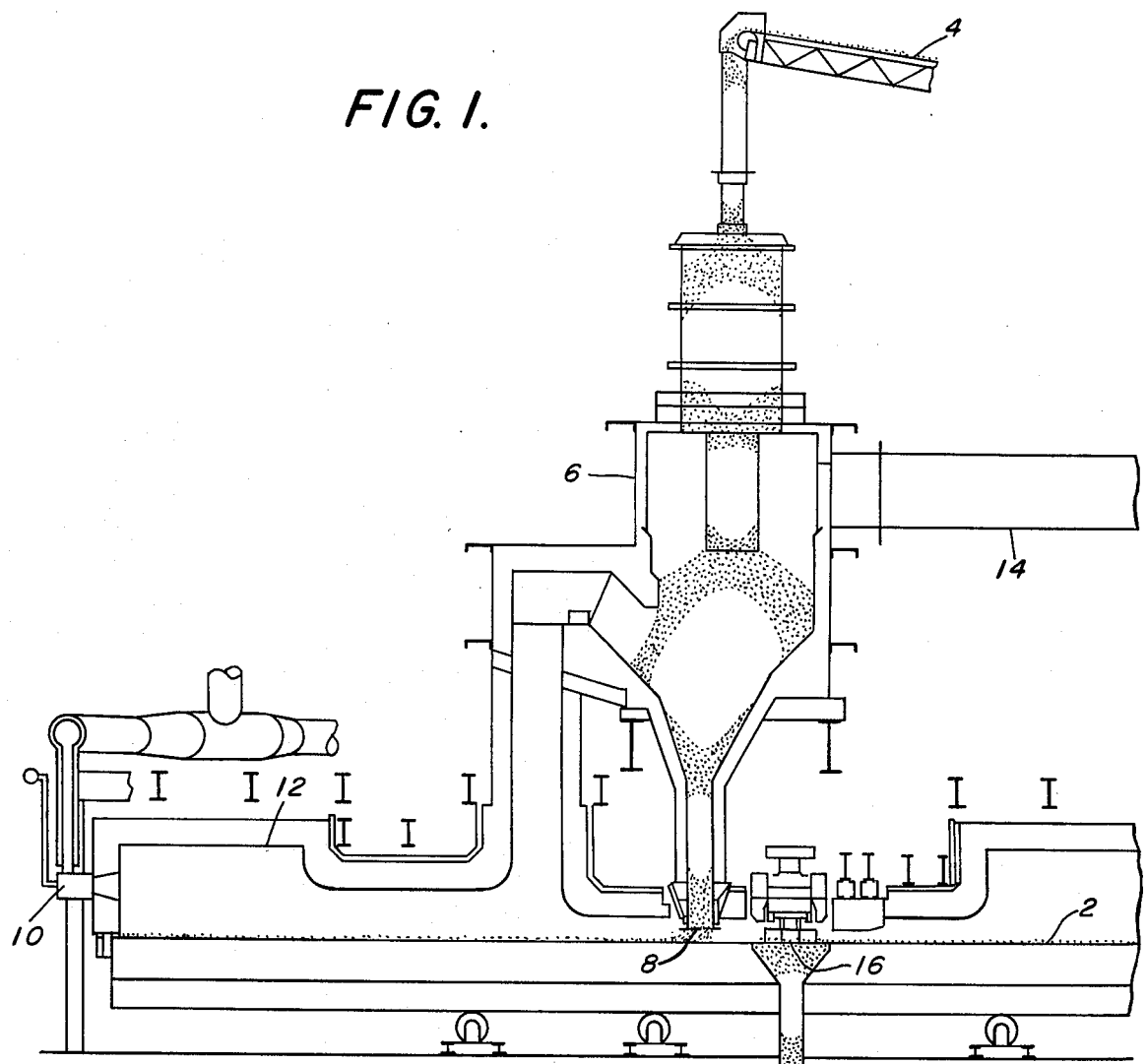
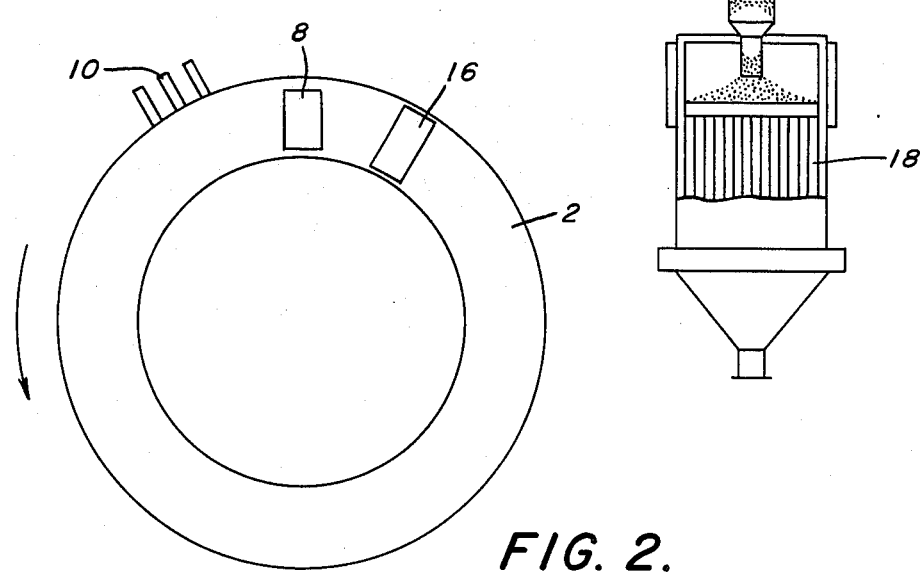
FIG. 2.

METHOD OF SINTERING CALCIUM ALUMINATE RAW MIXES

This application, which is a continuation-in-part of our co-pending application Ser. No. 249,011 filed May 1, 1972, now abandoned, which is a division of our co-pending application Ser. No. 58,188 filed July 24, 1970, now U.S. Pat. No. 3,677,781, which in turn is a continuation-in-part of our abandoned application Ser. No. 677,991 filed Oct. 25, 1967, relates to a method of sintering calcium aluminate raw mixes, and more particularly, to the making of clinkers for use in calcium aluminate cements. Such raw mixes must contain at least 28% by weight of $Al_2O_3$.

The sintering range of such raw mixes is relatively narrow and, in some types of raw mix, particularly ferruginous calcium aluminate raw mixes, the range is so narrow that it is commercially impossible or at least extremely difficult to maintain the temperature within the proper range without melting. We have found that by adding $SO_3$ in the form of $CaSO_4$ to the raw mix, the sintering range can be broadened by raising the melting point of the mix to such an extent that it is commercially possible to sinter the calcium aluminate raw mixes within that range.

To our knowledge it is not known to add $CaSO_4$ to calcium aluminate raw materials to be sintered. The closest art of which we have knowledge are British Pat. No. 929,202, Klein U.S. Pat. No. 3,251,701 dated May 17, 1966, Patrouilleau U.S. Pat. No. 1,694,338, and an article of Nobue Fukuda on pages 138–139 in Volume 34 of the Journal of the Chemical Society of Japan, January, 1961, entitled, "On the Constitution of Sulfo-Aluminous Clinker". Both the British and the Klein patents disclose adding $CaSO_4$ to portland cement raw mixes. In the British patent, a carbonaceous material and $CaSO_4$ are added to enable the mix to burn at a lower temperature. In this operation, because of the reducing conditions CaS is formed. The patent does not disclose any particular percentage of $CaSO_4$ addition.

The Klein patent adds gypsum to a portland cement type of raw mix to obtain the expansive component $C_4A_3\bar{S}$ in order to produce a suitable expansive portland cement. The minimum amount of gypsum added appears to to 11.5% which amounts to 8.4% $SO_3$ as calcium sulfate.

Patrouilleau is concerned with a method for the manufacture of aluminous cements by melting a mixture of oxides and lime. In all of his examples, elemental sulfur or sulfur compounds are added in amounts greater than 1.9% as sulfur. He teaches that the sulfur is released as $SO_2$ when the mix is heated to combination temperature. Patrouilleau also states the sulfur addition "constitutes an obstacle to silicatization, or dissociates this silicatization if already formed" (page 1, lines 31–33). He is not concerned with sintered aluminous cement but with melted aluminous cement. The $CaSO_4$ addition is released from the raw mix upon heating and fails to combine with calcium and alumina to form a $C_4A_3\bar{S}$ phase.

The Fukuda article teaches that the ternary compound $C_4A_3\bar{S}$ can be produced and identified by combining gypsum, bauxite and calcium carbonate. This compound is used as an expansive agent in expansive cements.

We have found that the minimum amount of addition of $SO_3$ as $CaSO_4$ to be effective in broadening the sintering range should be 0.5% and that the maximum amount should be 4.0%. Above 4.0% of $SO_3$, $C_4A_3\bar{S}$ increases at the expense of the monocalcium aluminate, which is the primary component of calcium aluminate cements that gives optimum strength producing properties in a 24-hour period. This results in an unsatisfactory product for use in calcium aluminate cements. The addition of $CaSO_4$ also raises the Pyrometric Cone Equivalent values and contributes to the hydraulic and refractory strength of the cement.

It is thus an object of our invention to provide a method of sintering calcium aluminate cement mixes in which the sintering range is broadened by the addition of $SO_3$ in the form of $CaSO_4$.

Another object is to provide such a method which is particularly necessary in the sintering of ferruginous calcium aluminate raw mixes containing a minimum of 5% $Fe_2O_3$.

These and other objects will be more apparent after referring to the following specification and attached drawings, in which:

FIG. 1 is an elevation of one form of apparatus which may be used in the practice of our invention;

FIG. 2 is a schematic plan view on a reduced scale showing the hearth of FIG. 1.

Figure 3:
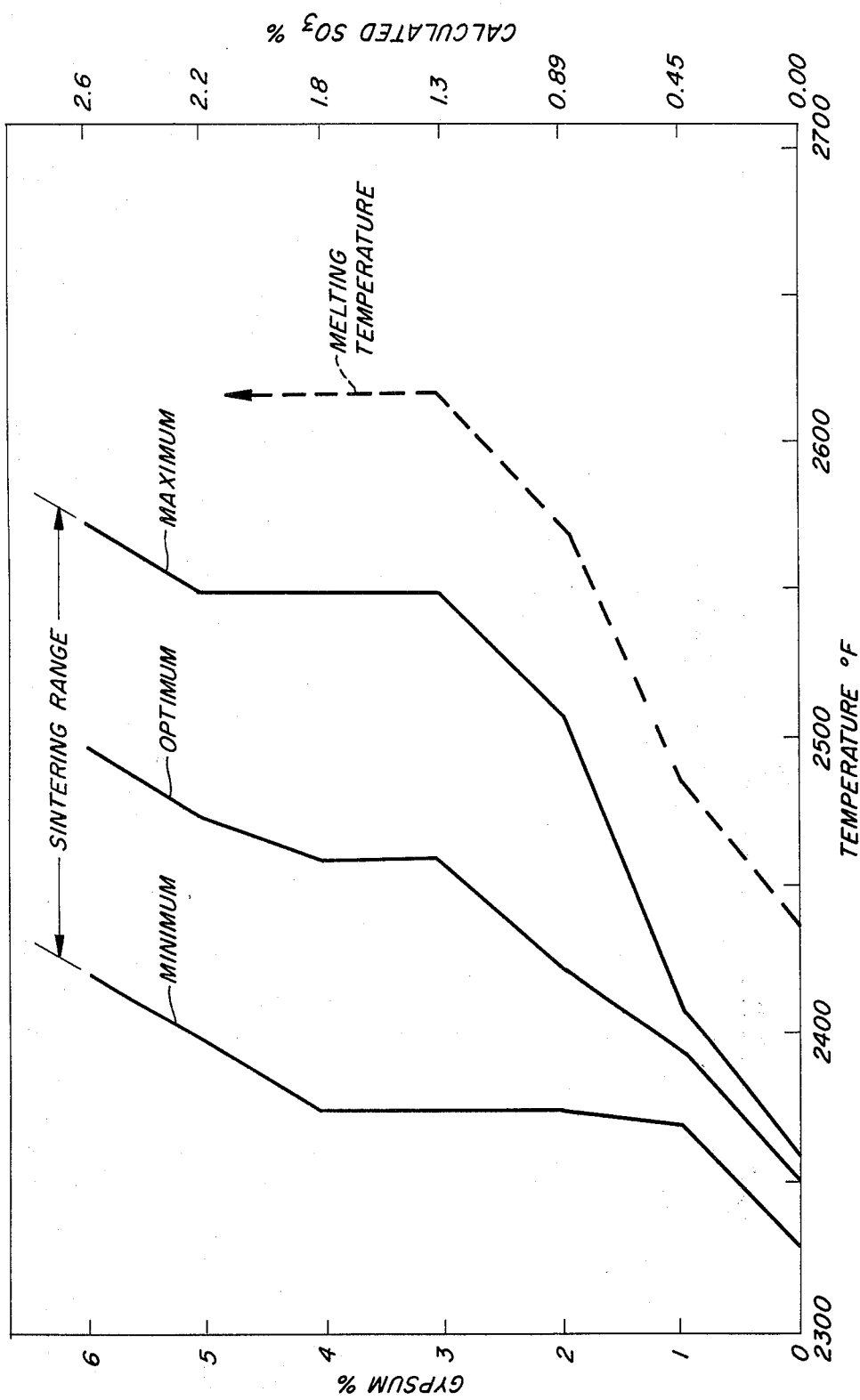
FIG. 3 is a graph showing the sintering range of calcium aluminate cement mixes containing varying amounts of gypsum.

According to our invention, we first select a raw mix of the composition necessary to provide a clinker suitable for grinding into a calcium aluminate cement of the desired composition. After the raw mix is prepared, it is heated to a temperature sufficient to remove surface water and water of crystallization therefrom. The raw mix is then fed directly into a heating chamber or hot zone, without substantial intermediate heating, where it is rapidly heated to a temperature below the melting point of the raw mix. It is preferred that the temperature be at least 50° below the melting point. The raw mix in granular form is fed to the hot zone at such a rate and in such a manner that there will be complete exposure of substantially all the pellets to the heat in order that the raw mix be raised to the desired temperature within 8 minutes.

One type of equipment in which the method has been practiced and which is shown schematically in the drawings is manufactured by Calcimatic, Ltd., of Toronto, Ontario. As shown, a donut-shaped hearth 2 is provided which rotates in a counter-clockwise direction. The raw mix is fed to the hearth 2 from a conveyor 4 through a preheater 6 and discharge gate 8. Burners 10 are located a short distance from the gate in a counter-clockwise direction and discharge into a hood 12 which surrounds the hearth 2. The exhaust gases pass from the hood 12 around the preheater 6 and exhaust through conduit 14. A takeoff 16 is provided a short distance clockwise from the gate 8 and the clinker is discharged therethrough to a cooler 18. The raw feed is heated in the preheater 6 and in the short distance on the hearth 2 between the gate 8 and burners 10 to a temperature below that at which complete carbonation takes place. This temperature is approximately 1600°F.

The pellets form a single layer on the hearth 2 so that, when they reach the position in front of the burners 10, they will be heated very rapidly to a sintering temperature below the melting point of the raw mix. The clinkers are preferably made from the following raw mixes in which the indicated numbers are percent by weight, the $Al_2O_3$ percentage including any $TiO_2$ which may be present:

|  | Broad Range | Type A | Type B |
|---|---|---|---|
| $SiO_2$ | 0 – 5.0 | 2.5 – 5.0 | 2.5 – 5.0 |
| $Al_2O_3$ | 28.0 – 56.0 | 32.0 – 37.0 | 35.0 – 41.0 |
| $Fe_2O_3$ | 0 – 7.0 | 5.0 – 7.0 | 0.4 – 1.4 |
| CaO | 14.0 – 42.0 | 23.0 – 28.0 | 21.0 – 26.0 |
| MgO | 0 – 3.0 | 0 – 1.5 | 0 – 1.5 |
| MnO | 0 – 1.0 | 0 – 0.6 | 0 – 0.6 |
| $SO_3$ as $CaSO_4$ | 0 – 4.0 | 0.5 – 2.6 | 0 – 1.6 |
| Alkalies | Trace | Trace | Trace |
| Loss on Ignition | 26.0 – 33.0 | 27.0 – 31.0 | 26.0 – 33.0 |

Specific raw mixes which may be used for making clinker for Type A and Type B cements are:

|  | Type A | Type B |
|---|---|---|
| $SiO_2$ | 3.3 | 3.3 |
| $Al_2O_3$ | 35.2 | 38.5 |
| $Fe_2O_3$ | 6.2 | .8 |
| CaO | 23.9 | 23.5 |
| MgO | 0.1 | .8 |
| MnO | .3 | .3 |
| $SO_3$ as $CaSO_4$ | 1.6 | 1.6 |
| Alkalies | Trace | Trace |
| Loss on Ignition | 29.4 | 31.2 |

From the above analyses it is seen that the $SO_3$ additions as $CaSO_4$ may vary from 0.5 to 4.0% and that the addition, while desirable in all cases, is necessary with ferruginous calcium aluminate raw mixes, such as the Type A raw mixes. The preferred range is from 0.5 to 2.6%.

In any of the cement mixes mentioned above, the initial heatings are preferably carried out for a period of 30 minutes to raise the mix temperature to approximately 1600°F. However, this temperature may be as low as 300°F. The shock sintering is at a temperature of approximately between 50° and 250°F. below the melting point of the raw mix. For Type A cement clinkers the material sintering temperature is preferably about 2450°F. and for Type B clinkers the preferred temperature is approximately 2500°F.

The calcium aluminate clinkers, when made under oxidizing or neutral conditions, include the compound $3CaO \cdot 3Al_2O_3 \cdot CaSO_4$ which is designated as $C_4A_3\bar{S}$ and has suitable hydraulic properties. The percentage of this compound will vary, depending on the amount of $SO_3$ added as $CaSO_4$ in the raw mix. The calculated $C_4A_3\bar{S}$ content of the clinker for the broad range is between 0 and 30.5%; for Type A between 3.8 and 19.8%; and for the specific examples of Types A and B, 12.2%.

It will be seen that the raw feed of each group of raw materials includes $SO_3$ in the form of $CaSO_4$. In Type A and other ferruginous calcium aluminate mixes this is essential to widen the sintering range to a practical range. While the sintering range in Type B raw feeds is sufficient for commercial practice, the range is further widened by the addition of $CaSO_4$.

As is shown in FIG. 3, the sintering range of calcium aluminate cement is from about 2330°F. to about 2360°F. without gypsum present in the mix. The sintering range increases slightly until, at about one percent gypsum (0.45 of $SO_3$) the range begins to broaden appreciably. At 1.3% $SO_3$ the sintering range is from about 2375°F. to about 2550°F., and at 2.6% $SO_3$ the range is from about 2425°F. to about 2575°F.

The addition of gypsum increases the amount of the $C_4A_3\bar{S}$ present at the expense of the monocalcium aluminate, effectively reducing the amount of the monocalcium aluminate necessary for early hydration and strength development. Above 4% of $SO_3$, the sintering range does not broaden appreciably but the $C_4A_3\bar{S}$ increases proportionately and reduces the amount of monocalcium aluminate in the cement, which likewise reduces the early strength development of the resulting cement. Further increases above 4% $SO_3$ will begin to lower the calcium aluminate compound formation which is the primary cementitious material. Therefore, our upper limit is 4.0% $SO_3$.

FIG. 3 shows the marked increase in sintering range at 0.5% $SO_3$ which is our lower limit. Further, since there is nothing to be gained and much early strength development to be lost by increasing the added $SO_3$ above 2.6%, that figure is our preferred upper limit.

While one embodiment of our invention has been shown and described, it will be apparent that other adaptations and modifications may be made without departing from the scope of the following claims.

We claim:

1. In the method of sintering a calcium aluminate raw mix including by weight at least 28% by weight of $Al_2O_3$, in which a raw mix is converted into a clinker by heating it to a temperature sufficient to remove surface water and water of crystallization, and then rapidly heated to a sintering temperature of at least 50° – 250°F below the melting point of the raw mix, wherein the improvement comprising adding from 0.5 to 4.0% $SO_3$ by weight to the mix in the form of $CaSO_4$ to broaden its sintering range.

2. The method of claim 1 in which the raw mix includes by weight 0 to 5% $SiO_2$, 28 to 56% $Al_2O_3$, 0 to 7% $Fe_2O_3$ and 14 to 42% CaO, and the loss on ignition is between 26 and 33%.

3. The method of claim 1 in which the added $SO_3$ is between 0.5 and 2.6%.

4. The method of claim 3 in which the raw mix includes by weight 2.5 to 5.0% $SiO_2$, 32 to 37% $Al_2O_3$, 5 to 7% $Fe_2O_3$, and 23 to 28% CaO, and the loss on ignition is between 27 and 31%.

* * * * *